(12) United States Patent
Homme et al.

(10) Patent No.: US 6,849,336 B2
(45) Date of Patent: Feb. 1, 2005

(54) SCINTILLATOR PANEL AND RADIATION IMAGE SENSOR

(75) Inventors: Takuya Homme, Shizuoka-ken (JP); Toshio Takabayashi, Shizuoka-ken (JP); Hiroto Sato, Shizuoka-ken (JP)

(73) Assignee: Hamamatsu Photonics K.K., Shizuoka-Ken (JP)

( * ) Notice: Subject to any disclaimer, the term of this patent is extended or adjusted under 35 U.S.C. 154(b) by 208 days.

(21) Appl. No.: 10/225,416

(22) Filed: Aug. 22, 2002

(65) Prior Publication Data

US 2002/0192471 A1 Dec. 19, 2002

Related U.S. Application Data

(63) Continuation of application No. 09/560,911, filed on Apr. 28, 2000, now Pat. No. 6,531,225, which is a continuation-in-part of application No. PCT/JP99/01911, filed on Apr. 9, 1999.

(30) Foreign Application Priority Data

Jun. 18, 1998 (JP) ............................................. 10/171190
Jun. 18, 1998 (JP) ............................................. 10/171191

(51) Int. Cl.$^7$ ................................................. B32B 9/00
(52) U.S. Cl. ........................... 428/408; 428/68; 428/76; 428/409; 250/368; 250/370.08; 250/370.9; 250/370.11; 250/370.12
(58) Field of Search .......................... 428/408, 68, 76, 428/409; 250/368, 370.8, 370.9, 370.11, 370.12; 382/128, 132

(56) References Cited

U.S. PATENT DOCUMENTS

| 4,547,670 A | * | 10/1985 | Sugimoto et al. ........... 250/370 |
| 5,132,539 A | | 7/1992 | Kwasnick et al. .......... 250/361 |
| 5,153,438 A | | 10/1992 | Kingsley et al. ....... 250/370.09 |
| 5,179,284 A | | 1/1993 | Kingsley et al. ....... 250/370.11 |
| 5,187,369 A | | 2/1993 | Kingsley et al. ....... 250/370.11 |
| 5,227,635 A | | 7/1993 | Iwanczyk ............. 250/370.12 |
| 5,585,638 A | | 12/1996 | Hoffman ............... 250/370.07 |
| 5,848,124 A | | 12/1998 | Inazuru ..................... 378/140 |
| 5,860,584 A | | 1/1999 | Inazuru ..................... 228/121 |
| 6,025,598 A | * | 2/2000 | Tago ....................... 250/370.1 |
| 6,429,437 B1 | | 8/2002 | Laugier ................ 250/370.11 |
| 6,531,225 B1 | * | 3/2003 | Homme et al. ............. 428/408 |

FOREIGN PATENT DOCUMENTS

| JP | 63-215987 | 9/1988 |
| JP | 63-216000 | 9/1988 |

(List continued on next page.)

Primary Examiner—Deborah Jones
Assistant Examiner—Abraham Bahta
(74) Attorney, Agent, or Firm—Morgan, Lewis & Bockius LLP

(57) ABSTRACT

The surfaces of an amorphous carbon substrate 10 of a scintillator panel 1 have undergone sandblasting, and an Al film 12 serving as a reflecting film is formed on one surface. A columnar scintillator 14 for converting incident radiation into visible light is formed on the surface of the Al film 12.

6 Claims, 6 Drawing Sheets

FOREIGN PATENT DOCUMENTS

| | | |
|---|---|---|
| JP | 1-267500 | 10/1989 |
| JP | 3-163391 | 7/1991 |
| JP | 3-3163391 | 7/1991 |
| JP | 5-60871 | 3/1993 |
| JP | 5-39558 | 6/1993 |
| JP | 5-188148 | 7/1993 |
| JP | 05-189757 | 7/1993 |
| JP | 5-203755 | 8/1993 |
| JP | 5-299044 | 11/1993 |
| JP | 7-21560 | 3/1995 |
| JP | 7-209495 | 8/1995 |
| JP | 7-218698 | 8/1995 |
| JP | 7-270599 | 10/1995 |
| JP | 8-198687 | 8/1996 |
| JP | 08-329465 | 12/1996 |
| JP | 9-257947 | 10/1997 |
| WO | WO98/36290 | 8/1998 |
| WO | WO98/36291 | 8/1998 |
| WO | WO99/38031 | 7/1999 |

* cited by examiner

Fig. 10

| | TUBE VOLTAGE Kv | INDUSTRIAL HALF-WAVE RECTIFYING X-RAY TUBE | | |
|---|---|---|---|---|
| | | 40 | 50 | 60 |
| PRIOR ART | SUBSTRATE=Al 1mm | 100% | 100% | 100% |
| FIRST EMBODIMENT | SUBSTRATE=a-C 1mm +Al FILM | 260% | 230% | 220% |
| SECOND EMBODIMENT | SUBSTRATE=a-C 1mm +Al FILM+LiF FILM | 300% | 270% | 260% |
| THIRD EMBODIMENT | SUBSTRATE=a-C 1mm +LiF FILM | 220% | 200% | 190% |
| FOURTH EMBODIMENT | SUBSTRATE=a-C 1mm | 150% | 135% | 130% |

US 6,849,336 B2

SCINTILLATOR PANEL AND RADIATION IMAGE SENSOR

RELATED APPLICATION

This application is a Continuation patent application of U.S. application Ser. No. 09/560,911 filed on Apr. 28, 2000, now U.S. Pat. No. 6,531,225, which is a Continuation-in-Part application of International Application No. PCT/JP99/01911 filed on Apr. 9, 1999.

BACKGROUND OF THE INVENTION

1. Field of the Invention

The present invention relates to a scintillator panel and radiation image sensor used for medical X-ray photography and the like.

2. Related Background Art

Conventionally, X-ray photosensitive films have been used for medical and industrial X-ray photography. However, radiation imaging systems using radiation detectors have come into widespread use owing to advantages in convenience and retention of photographic results. In such a radiation imaging system, pixel data based on 2D radiation is acquired as an electrical signal by the radiation detector, and the signal is processed by the processor and displayed on the monitor.

As a conventional, typical radiation detector, a radiation detector having a structure in which an image sensing element is stuck to a scintillator panel having a scintillator formed on a substrate made of aluminum, glass, molten quartz, or the like is available. In this radiation detector, the scintillator converts radiations incident from the substrate side into light, and the image sensing element detects the light (see Japanese Patent Publication No. 7-21560).

A radiation detector for medical purposes, especially for dental examination, uses low-energy X-rays. If, therefore, an aluminum substrate is used, quite a few X-ray components are absorbed by the substrate. In a radiation detector using low-energy X-rays, therefore, the substrate of the scintillator panel is required to have high radiation transmittance.

It is an object of the present invention to provide a scintillator panel which increases the optical output by using a substrate having high radiation transmittance for the scintillator panel, and a radiation image sensor using the scintillator panel.

SUMMARY OF THE INVENTION

A scintillator panel of the present invention is characterized by comprising a substrate made of carbon as a major constituent, a reflecting film formed on said substrate, a scintillator deposited on said reflecting film, a protective film covering said substrate and said scintillator.

According to this scintillator panel, since the substrate made of carbon as a major constituent has high radiation transmittance, the amount of radiation absorbed by the substrate can be decreased, and the amount of radiation reaching the scintillator can be increased.

A radiation image sensor according to the present invention is characterized by having an image sensing element placed to oppose the scintillator of the scintillator panel comprising a substrate made of carbon as a major constituent, a scintillator deposited on the substrate, and a protective film covering the scintillator.

According to this radiation image sensor, since the scintillator panel has the substrate made of carbon as a major constituent having high radiation transmittance, the amount of light reaching the image sensing element can be increased.

BRIEF DESCRIPTION OF THE DRAWINGS

FIG. 10 is a view showing outputs from the radiation image sensors according to the first to fourth embodiments in comparison with outputs from the conventional radiation image sensor.

DESCRIPTION OF THE PREFERRED EMBODIMENTS

Figure 1:
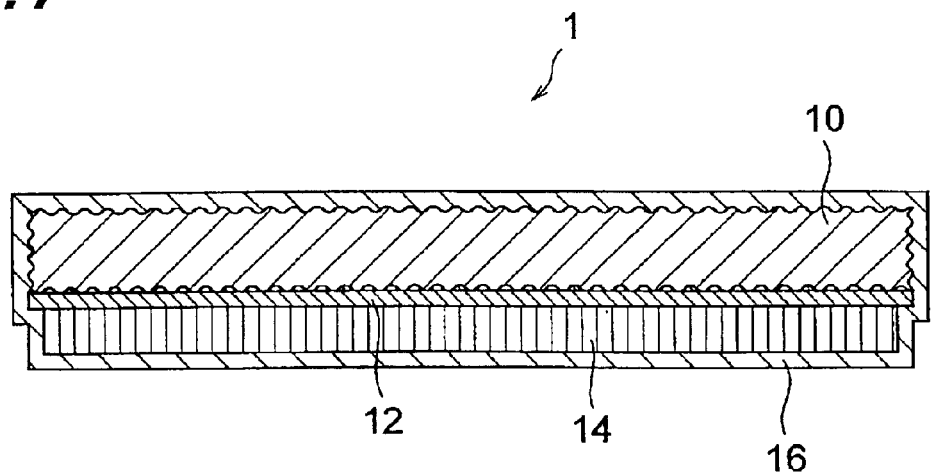
FIG. 1 is a sectional view of a scintillator panel according to the first embodiment.
Figure 2:
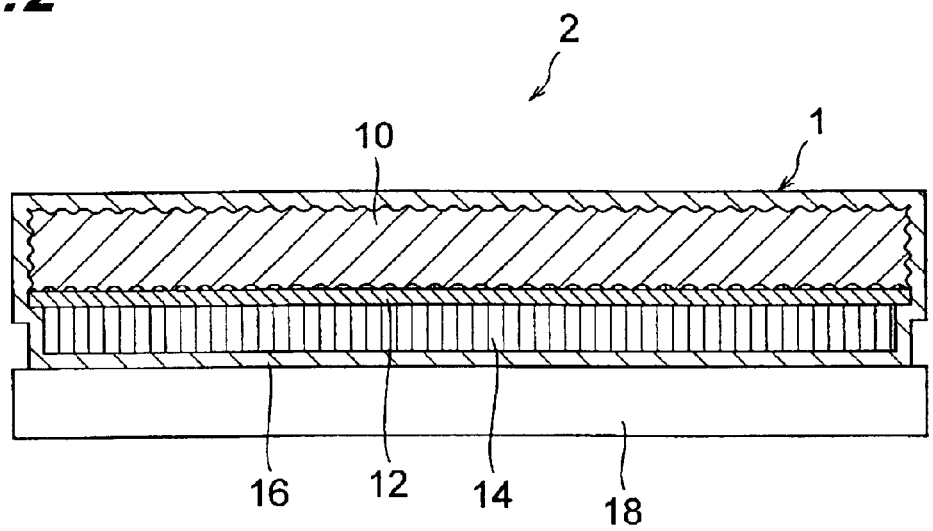
FIG. 2 is a sectional view of a radiation image sensor according to the first embodiment.

The first embodiment of the present invention will be described below with reference to FIGS. 1, 2, and 3A to 3D. FIG. 1 is a sectional view of a scintillator panel 1. FIG. 2 is a sectional view of a radiation image sensor 2.

As shown in FIG. 1, the surfaces of an amorphous carbon (a-C) (glassy carbon or glass-like carbon) substrate 10 have undergone sandblasting, and an Al film 12 serving as a reflecting film is formed on one surface. A columnar scintillator 14 for converting incident radiation into visible light is formed on the surface of the Al film 12. Note that Tl-doped CsI is used for the scintillator 14. The scintillator 14 is covered with a polyparaxylylene film 16, together with the substrate 10.

As shown in FIG. 2, the radiation image sensor 2 has a structure in which an image sensing element 18 is stuck to the distal end side of the scintillator 14.

The steps in manufacturing the scintillator panel 1 will be described next with reference to FIGS. 3A to 3D. Sandblasting is performed on the surfaces of the rectangular or circular a-C substrate 10 (thickness: 1 mm) by using glass beads (#800). Fine projections/recesses are formed on the surfaces of the substrate 10 by this sandblasting (see FIG. 3A).

Figure 3A:
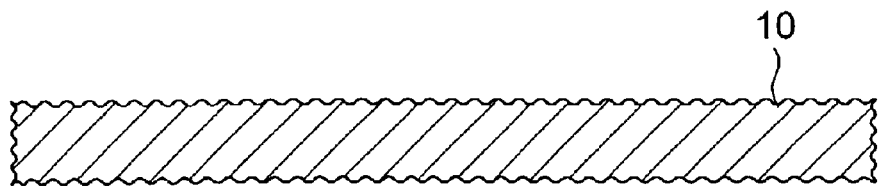
FIG. 3A is a view showing the step in manufacturing the scintillator panel according to the first embodiment.
Figure 3B:
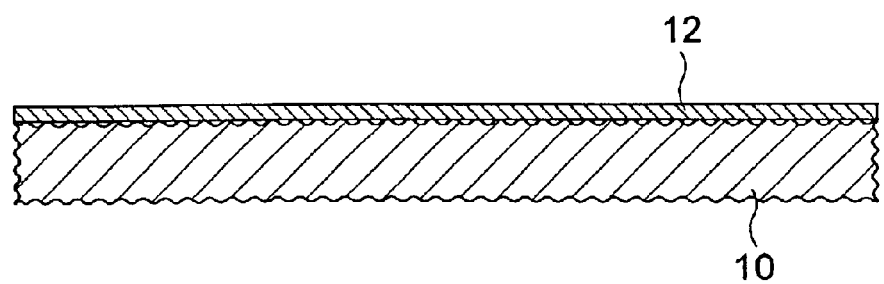
FIG. 3B is a view showing the step in manufacturing the scintillator panel according to the first embodiment.
Figure 3C:
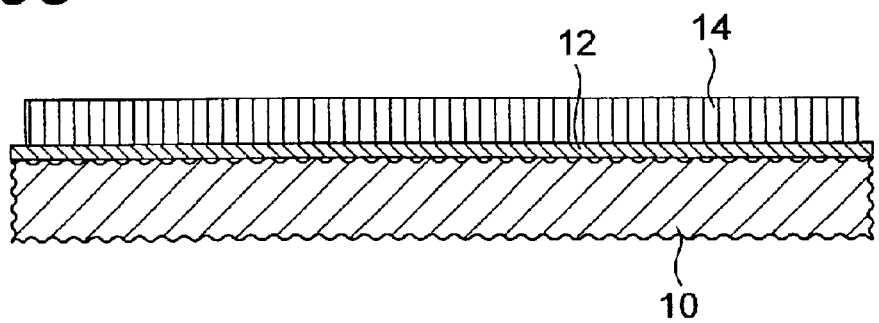
FIG. 3C is a view showing the step in manufacturing the scintillator panel according to the first embodiment.
Figure 3D:
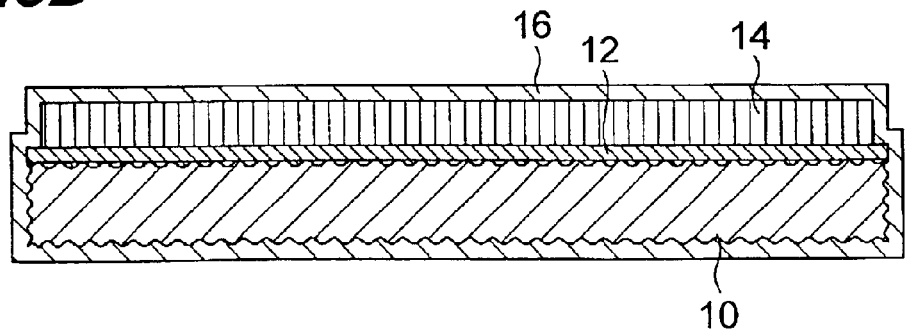
FIG. 3D is a view showing the step in manufacturing the scintillator panel according to the first embodiment.

The Al film 12 serving as a reflecting film is then formed on one surface of the substrate 10 to a thickness of 100 nm by vacuum vapor deposition (see FIG. 3B). A Tl-doped columnar CsI crystal is grown on the surface of the Al film 12 by vapor deposition to form the scintillator 14 having a thickness of 250 μm (see FIG. 3C).

CsI used to form this scintillator 14 has high hygroscopicity, and hence absorbs water vapor from the air and deliquesces if it is kept exposed to the air. In order to prevent this, the polyparaxylylene film 16 is formed by the CVD method. More specifically, the substrate 10 on which the scintillator 14 is formed is placed in a CVD apparatus, and the polyparaxylylene film 16 is formed to a thickness of 10 μm. With this process, the polyparaxylylene film 16 is formed on the entire surfaces of the scintillator 14 and substrate 10 (see FIG. 3D). Since the polyparaxylylene film 16 is formed on the surfaces of the substrate 10, the moisture-proof characteristics of the scintillator 14 can be improved. In addition, since the polyparaxylylene film 16 is formed on the entire surfaces of the substrate 10, the moisture-proof characteristics of the scintillator 14 can be further improved.

Note that the formation of the fine projections/recesses on the surfaces of the substrate 10 by sandblasting can improve the adhesion characteristics between the polyparaxylylene film 16 and the substrate 10, thus preventing peeling of the polyparaxylylene film 16.

The radiation image sensor 2 is manufactured by sticking the image sensing element (CCD) 18 to the distal end portion side of the scintillator 14 of the completed scintillator panel 1 such that the light-receiving portion opposes the distal end portion side (see FIG. 2).

According to the radiation image sensor 2 of this embodiment, radiation incident from the substrate 10 side is converted into light by the scintillator 14 and detected by the image sensing element 18. In this case, since a-C substrate 10 has high radiation transmittance, the amount of radiation absorbed by the substrate 10 can be reduced. Hence, the amount of radiation reaching the scintillator 14 can be increased. In addition, since the Al film 12 as a reflecting film is formed, light incident on the light-receiving portion of the image sensing element 18 can be increased. This makes it possible to sharpen the image detected by the radiation image sensor.

FIG. 10 shows outputs from the radiation image sensor 2 which are obtained when the radiation image sensor 2 detects the X-rays generated by applying 40 kV, 50 kV, and 60 kV as tube voltages to the half-wave rectifying x-ray tube, in comparison with outputs from the conventional radiation image sensor. More specifically, if the output obtained when the conventional radiation image sensor detects the X-ray generated by applying 40 kv as a tube voltage to the half-wave rectifying X-ray tube is assumed to be 100%, the output obtained when the X-ray is detected by the radiation image sensor 2 is 260%. If the output obtained when the conventional radiation image sensor detects the X-ray generated by applying 50 kV as a tube voltage to the half-wave rectifying X-ray tube is assumed to be 100%, the output obtained when the X-ray is detected by the radiation image sensor 2 is 230%. If the output obtained when the conventional radiation image sensor detects the X-ray generated by applying 60 kV as a tube voltage to the half-wave rectifying X-ray tube is assumed to be 100%, the output obtained when the x-ray is detected by the radiation image sensor 2 is 220%.

The second embodiment of the present invention will be described next. Note that the same reference numerals denoting the parts of the scintillator panel 1 and radiation image sensor 2 as in the first embodiment denote the same parts in the second embodiment.

Figure 4:
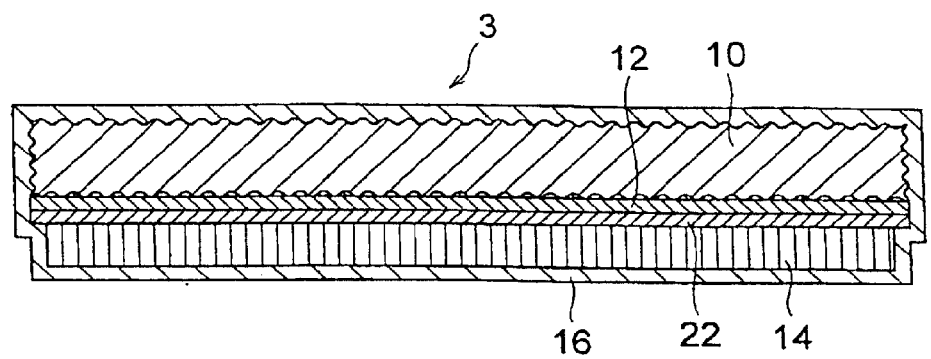
FIG. 4 is a sectional view of a scintillator panel according to the second embodiment.
Figure 5:
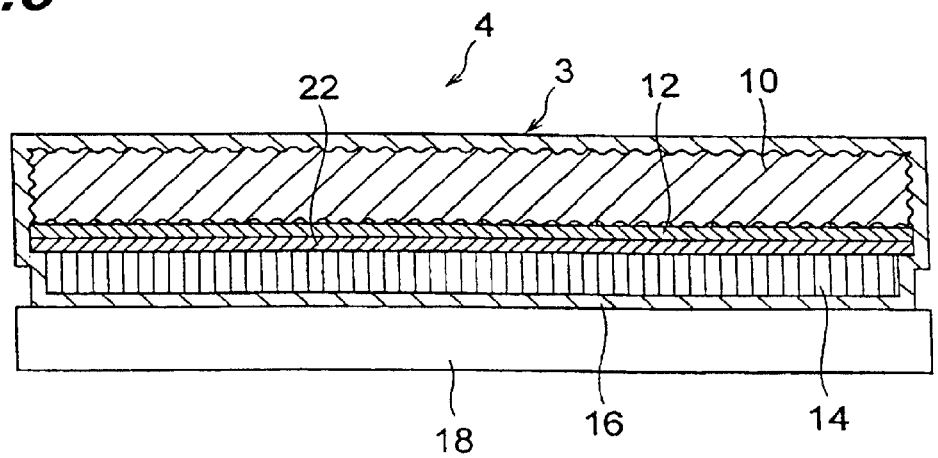
FIG. 5 is a sectional view of a radiation image sensor according to the second embodiment.

FIG. 4 is a sectional view of a scintillator panel 3. FIG. 5 is a sectional view of a radiation image sensor 4. As shown in FIG. 4, the surfaces of a-C substrate 10 of the scintillator panel 3 have undergone sandblasting, and an Al film 12 serving as a reflecting film is formed on one surface. As a low-refractive-index member, an LiF film (thin transparent film) 22 having a refractive index (refractive index=1.3) lower than that of a scintillator 14 is formed on the Al film 12. The columnar scintillator 14 for converting incident radiation into visible light is formed on the surface of the LiF film 22. Note that Tl-doped CsI (refractive index=1.8) is used for the scintillator 14. The scintillator 14 is covered with a polyparaxylylene film 16, together with the substrate 10.

As shown in FIG. 5, the radiation image sensor 4 has a structure in which an image sensing element 18 is stuck to the scintillator 14 side of the scintillator panel 3.

The steps in manufacturing the scintillator panel 3 will be described next. First of all, sandblasting is performed on the surfaces of the rectangular or circular a-C substrate 10 (thickness: 1 mm) by using glass beads (#800) thereby forming fine projections/recesses on the surfaces of the substrate 10.

The Al film 12 serving as a reflecting film is then formed on one surface of the substrate 10 to a thickness of 100 nm by vacuum vapor deposition, and the LiF film 22 as a low-refractive-index member is formed on the Al film 12 to a thickness of 100 nm by vacuum vapor deposition. A Tl-doped columnar CsI crystal is grown on the surface of the LiF film 22 by vapor deposition to form the scintillator 14 having a thickness of 250 μm. The polyparaxylylene film 16 is formed to a thickness of 10 μm by the CVD method. With this process, the polyparaxylylene film 16 is formed on the entire surfaces of the scintillator 14 and substrate 10. Since the polyparaxylylene film 16 is formed on the surfaces of the substrate 10, the moisture-proof characteristics of the scintillator 14 can be improved. In addition, since the polyparaxylylene film 16 is formed on the entire surfaces of the substrate 10, the moisture-proof characteristics of the scintillator 14 can be further improved.

The radiation image sensor 4 is manufactured by sticking the image sensing element (CCD) 18 to the distal end portion of the scintillator 14 of the completed scintillator panel 3 such that the light-receiving portion opposes the distal end portion (see FIG. 5).

According to the radiation image sensor 4 of this embodiment, radiation incident from the substrate 10 side is converted into light by the scintillator 14 and detected by the image sensing element 18. In this case, since a-C substrate 10 has high radiation transmittance, the amount of radiation absorbed by the substrate 10 can be reduced. Hence, the amount of radiation reaching the scintillator 14 can be increased. In addition, since the Al film 12 as a reflecting film and the LiF film 22 as a low-refractive-index member are formed, light incident on the light-receiving portion of the image sensing element 18 can be increased. This makes it possible to sharpen the image detected by the radiation image sensor.

As shown in FIG. 10, if the output obtained when the conventional radiation image sensor detects the X-ray generated by applying 40 kV as a tube voltage to the half-wave rectifying X-ray tube is assumed to be 100%, the output obtained when the X-ray is detected by the radiation image sensor 4 is 300%. If the output obtained when the conventional radiation image sensor detects the X-ray generated by applying 50 kV as a tube voltage to the half-wave rectifying X-ray tube is assumed to be 100%, the output obtained when the X-ray is detected by the radiation image sensor 4 is 270%. If the output obtained when the conventional radiation image sensor detects the X-ray generated by applying 60 kv as a tube voltage to the half-wave rectifying x-ray tube is assumed to be 100%, the output obtained when the X-ray is detected by the radiation image sensor 4 is 260%.

The third embodiment of the present invention will be described next. Note that the same reference numerals denoting the parts of the scintillator panels 1 and 3 and radiation image sensors 2 and 4 as in the first and second embodiments denote the same parts in the third embodiment.

Figure 6:
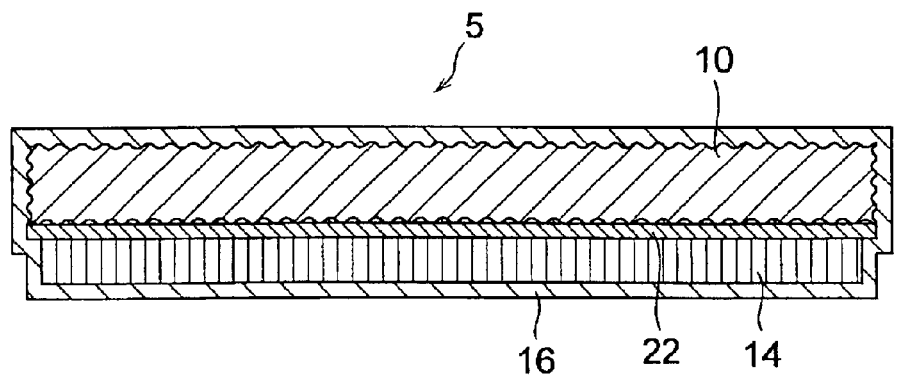
FIG. 6 is a sectional view of a scintillator panel according to the third embodiment.
Figure 7:
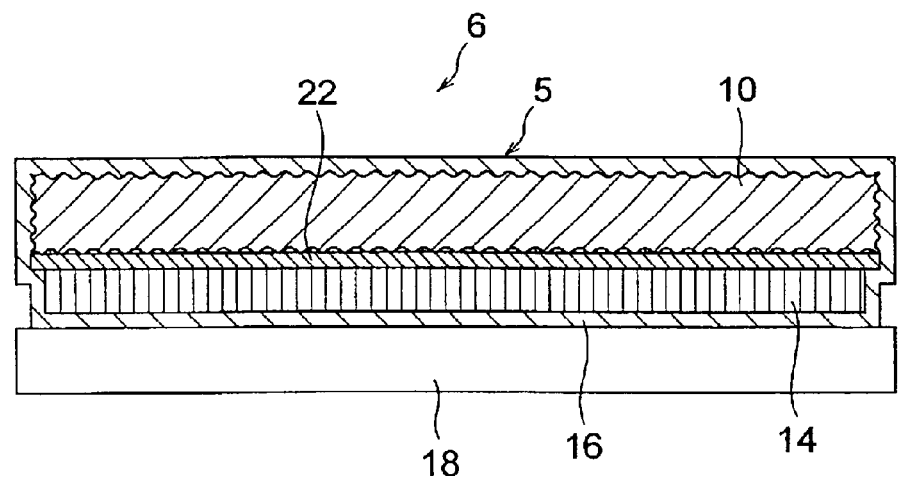
FIG. 7 is a sectional view of a radiation image sensor according to the third embodiment.

FIG. 6 is a sectional view of a scintillator panel 5. FIG. 7 is a sectional view of a radiation image sensor 6. As shown in FIG. 6, the surfaces of a-C substrate 10 of the scintillator panel 3 have undergone sandblasting, and an LiF film (thin transparent film) 22 is formed on one surface. A columnar scintillator 14 for converting incident radiation into visible light is formed on the surface of the LiF film 22. Note that Tl-doped CsI is used for the scintillator 14. The scintillator 14 is covered with a polyparaxylylene film 16, together with the substrate 10.

As shown in FIG. 7, the radiation image sensor 6 has a structure in which an image sensing element 18 is stuck to the distal end portion side of the scintillator 14 of the scintillator panel 5.

The steps in manufacturing the scintillator panel 5 will be described next. First of all, sandblasting is performed on the surfaces of the rectangular or circular a-C substrate 10 (thickness: 1 mm) by using glass beads (#800), thereby forming fine projections/recesses on the surfaces of the substrate 10.

The LiF film 22 as a low-refractive-index member is then formed on one surface of the substrate 10 to a thickness of 100 nm by vacuum vapor deposition. A Tl-doped columnar CsI crystal is grown on the surface of the LiF film 22 by vapor deposition to form the scintillator 14 having a thickness of 250 $\mu$m. The polyparaxylylene film 16 is formed to a thickness of 10 $\mu$m by the CVD method. With this process, the polyparaxylylene film 16 is formed on the entire surfaces of the scintillator 14 and substrate 10. Since the polyparaxylylene film 16 is formed on the surfaces of the substrate 10, the moisture-proof characteristics of the scintillator 14 can be improved. In addition, since the polyparaxylylene film 16 is formed on the entire surfaces of the substrate 10, the moisture-proof characteristics of the scintillator 14 can be further improved.

The radiation image sensor 6 is manufactured by sticking the image sensing element (CCD) 18 to the distal end portion side of the scintillator 14 of the completed scintillator panel 5 such that the light-receiving portion opposes the distal end portion side (see FIG. 7).

According to the radiation image sensor 6 of this embodiment, radiation incident from the substrate 10 side is converted into light by the scintillator 14 and detected by the image sensing element 18. In this case, since a-C substrate 10 has high radiation transmittance, the amount of radiation absorbed by the substrate 10 can be reduced. Hence, the amount of radiation reaching the scintillator 14 can be increased. In addition, since the LiF film 22 is formed as a low-refractive-index member, light satisfying the total reflection condition is reflected by the interface between the scintillator 14 and the LiF film 22, and the amount of light incident on the light-receiving portion of the image sensing element 18 can be increased. This makes it possible to sharpen the image detected by the radiation image sensor.

As shown in FIG. 10, if the output obtained when the conventional radiation image sensor detects the X-ray generated by applying 40 kv as a tube voltage to the half-wave rectifying X-ray tube is assumed to be 100%, the output obtained when the X-ray is detected by the radiation image sensor 6 is 220%. If the output obtained when the conventional radiation image sensor detects the X-ray generated by applying 50 kV as a tube voltage to the half-wave rectifying X-ray tube is assumed to be 100%, the output obtained when the X-ray is detected by the radiation image sensor 6 is 200%. If the output obtained when the conventional radiation image sensor detects the X-ray generated by applying 60 kV as a tube voltage to the half-wave rectifying X-ray tube is assumed to be 100%, the output obtained when the X-ray is detected by the radiation image sensor 6 is 190%.

The fourth embodiment of the present invention will be described next. Note that the same reference numerals denoting the parts of the scintillator panel 1 and radiation image sensor 2 as in the first embodiment denote the same parts in the fourth embodiment.

Figure 8:
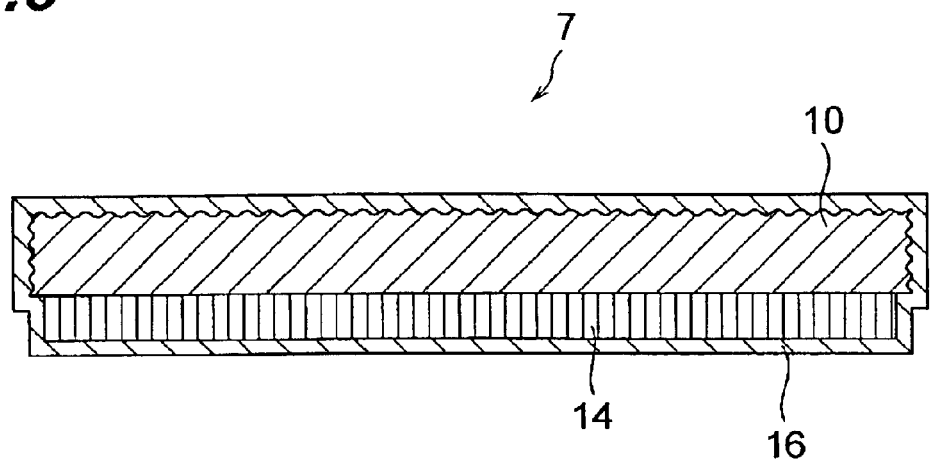
FIG. 8 is a sectional view of a scintillator panel according to the fourth embodiment.
Figure 9:
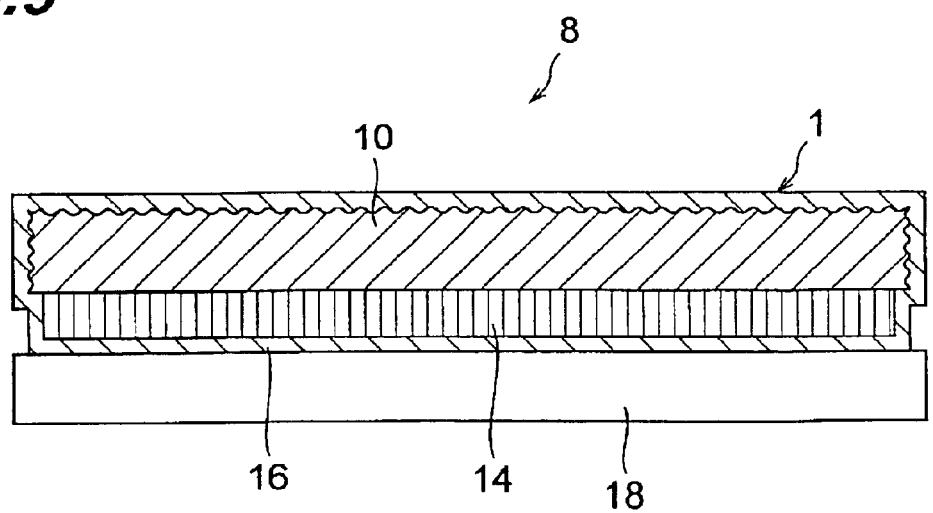
FIG. 9 is a sectional view of a radiation image sensor according to the fourth embodiment.

FIG. 8 is a sectional view of a scintillator panel 7. FIG. 9 is a sectional view of a radiation image sensor 8. As shown in FIG. 8, one surface and side surfaces of a-C substrate 10 of the scintillator panel 7 have undergone sandblasting, and the other surface is mirror-polished.

A columnar scintillator 14 for converting incident radiation into visible light is formed on the other surface of this substrate. Note that Tl-doped CsI is used for the scintillator 14. The scintillator 14 is covered with a polyparaxylylene film 16, together with the substrate 10.

As shown in FIG. 9, the radiation image sensor 8 has a structure in which an image sensing element 18 is stuck to the scintillator 14 side of the scintillator panel 7.

The steps in manufacturing the scintillator panel 7 will be described next. First of all, sandblasting is performed on the surfaces of the rectangular or circular a-C substrate 10 (thickness: 1 mm) by using glass beads (#800), thereby forming fine projections/recesses on the surfaces of the substrate 10. In addition, the other surface of the substrate 10 is mirror-polished.

A Tl-doped columnar CsI crystal is grown on the other surface of the substrate 10 by vapor deposition to form the scintillator 14 having a thickness of 250 $\mu$m. The polyparaxylylene film 16 is formed to a thickness of 10 $\mu$m by the CVD method. With this process, the polyparaxylylene film 16 is formed on the entire surfaces of the scintillator 14 and substrate 10. Since the polyparaxylylene film 16 is formed on the surfaces of the substrate 10, the moisture-proof characteristics of the scintillator 14 can be improved. In addition, since the polyparaxylylene film 16 is formed on the entire surfaces of the substrate 10, the moisture-proof characteristics of the scintillator 14 can be further improved.

The radiation image sensor 8 is manufactured by sticking the image sensing element (CCD) 18 to the distal end portion side of the scintillator 14 of the completed scintillator panel 7 such that the light-receiving portion opposes the distal end portion side (see FIG. 9).

According to the radiation image sensor 8 of this embodiment, radiation incident from the substrate 10 side is converted into light by the scintillator 14 and detected by the image sensing element 18. In this case, since a-C substrate 10 has high radiation transmittance, the amount of radiation absorbed by the substrate 10 can be reduced. Hence, the amount of radiation reaching the scintillator 14 can be increased. This can increase the amount of light incident on the light-receiving portion of the image sensing element 18, thereby sharpening the image detected by the radiation image sensor 8.

As shown in FIG. 10, if the output obtained when the conventional radiation image sensor detects the X-ray generated by applying 40 kV as a tube voltage to the half-wave rectifying X-ray tube is assumed to be 100%, the output obtained when the X-ray is detected by the radiation image sensor 8 is 150%. If the output obtained when the conventional radiation image sensor detects the X-ray generated by applying 50 kV as a tube voltage to the half-wave rectifying X-ray tube is assumed to be 100%, the output obtained when the X-ray is detected by the radiation image sensor 8 is 135%. If the output obtained when the conventional radiation image sensor detects the X-ray generated by applying 60 kV as a tube voltage to the half-wave rectifying X-ray tube is assumed to be 100%, the output obtained when the X-ray is detected by the radiation image sensor 8 is 130%.

In each embodiment described above, the polyparaxylylene film 16 is formed on the entire surfaces of the substrate 10. However, the polyparaxylylene film 16 may be formed on a part of the surfaces of the substrate 10. For example, the polyparaxylylene film 16 may be formed on a part of the exposed surface of the substrate 10, having no scintillator thereon.

In each embodiment described above, the a-C substrate is used. However, a graphite substrate may be used. The graphite substrate has high radiation transmittance like the a-C substrate. In this case, therefore, the amount of radiation reaching the scintillator can be increased as in the case wherein the a-C substrate is used.

In the above embodiments, a LiF film is used as a thin transparent film. However, a film made of a material containing selected from the group consisting of LiF, $MgF_2$, $CaF_2$, $SiO_2$, $Al_2O_3$, MgO, NaCl, KBr, KCl, and AgCl may be used.

In each embodiment described above, CsI (Ti) is used as the scintillator 14. However, the present invention is not limited to this. For example, CsI (Na), NaI (Tl), LiI (Eu), or KI (Tl) may be used.

In each embodiment described above, examples of the polyparaxylylene are polymonochloroparaxylylene, polydichloroparaxylylene, polytetrachloroparaxylylene, polyfluoroparaxylylene, polydimethylparaxylylene, and polydiethylparaxylylene.

According to the scintillator panel of the present invention, since the substrate made of carbon as a major constituent has high radiation transmittance, the amount of radiation absorbed by the substrate can be decreased, and the amount of radiation reaching the scintillator can be increased.

In addition, according to the radiation image sensor of the present invention, since the scintillator panel has the substrate made of carbon as a major constituent having high radiation transmittance, the amount of light reaching the image sensing element can be increased.

As described above, the scintillator panel and radiation image sensor of the present invention are suited for medical X-ray photography and the like.

What is claimed is:

1. A radiation image sensor comprising:

a scintillator pane, wherein the scintillator panel comprises:

a radiation transmittable substrate;

a scintillator facing toward on a radiation emitting surface of said substrate; and a protective film, which transmits light generated by said scintillator, substantially encapsulating said substrate and said scintillator, wherein said protective film is an organic film substantially continuously formed on upper and side surfaces of said scintillator and substrate as a single integral component; and an image sensing element facing toward and optically coupled with said scintillator.

2. A radiation image sensor according to claim 1, further comprising a reflecting film formed between said substrate and said scintillator.

3. A radiation image sensor according to claim 1, wherein said scintillator is a columnar scintillator comprising multiple scintillator columns.

4. A scintillator panel comprising:

a radiation transmittable substrate;

a scintillator deposited on a radiation emitting surface of said substrate; and a protective film, which transmits light generated by said scintillator, substantially encapsulating said substrate and said scintillator, wherein said protective film is an organic film substantially continuously formed on upper and side surfaces of said scintillator and substrate as a single integral component.

5. A scintillator panel according to claim 4, further comprising a reflecting film formed between said substrate and said scintillator.

6. A scintillator panel according to claim 4, wherein said scintillator is a columnar scintillator comprising multiple scintillator columns.

* * * * *